Jan. 21, 1947.  H. A. GREENWALD  2,414,520
WINDSHIELD DE-ICING
Filed June 14, 1943
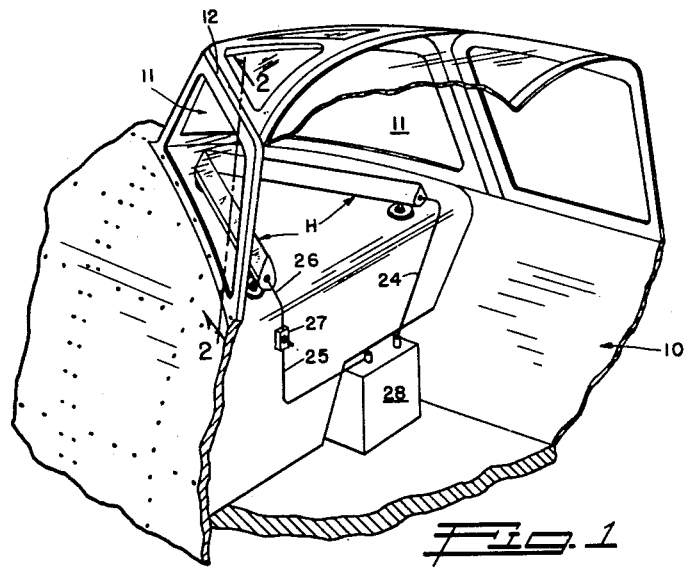
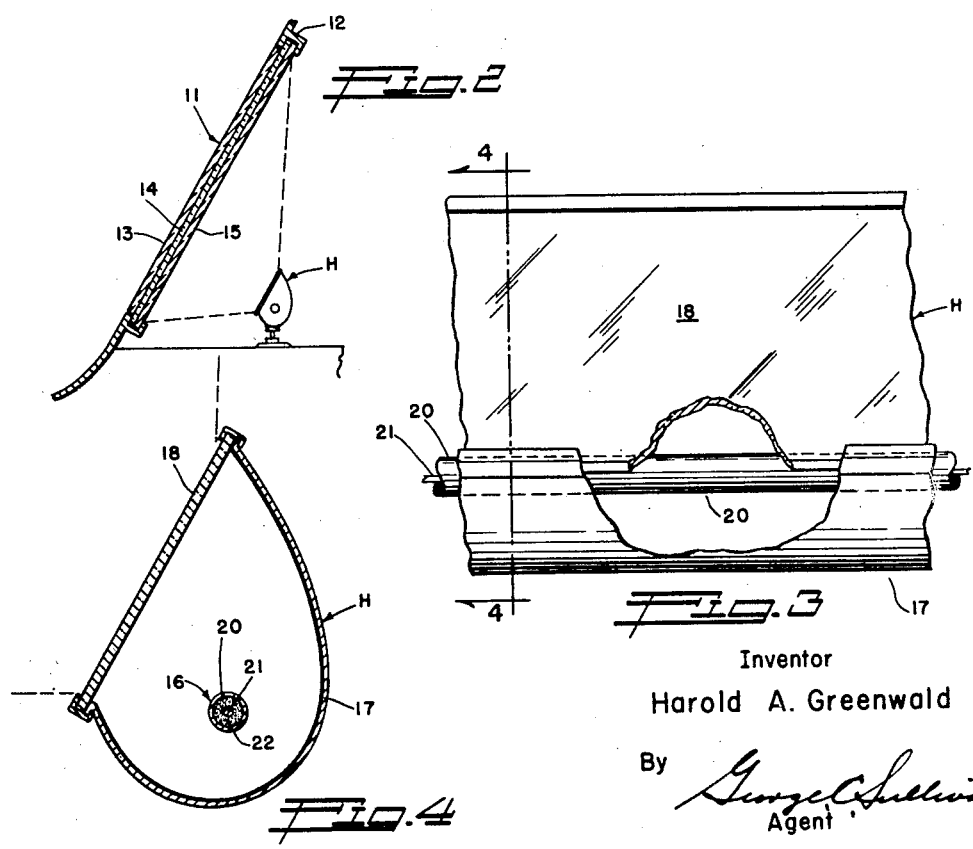
Inventor
Harold A. Greenwald
By George C. Sullivan
Agent Patented Jan. 21, 1947

2,414,520

UNITED STATES PATENT OFFICE 2,414,520

WINDSHIELD DEICING

Harold A. Greenwald, Hollywood, Calif., assignor to Lockheed Aircraft Corporation, Burbank, Calif.

Application June 14, 1943, Serial No. 490,936

2 Claims. (Cl. 20—40.5)

This invention relates in general to de-icing of windows and windshields of vehicles and finds its most particular application to the pilot compartment windshields of airplanes which may be flown under weather conditions which are conducive to icing.

Heretofore, it has been attempted to overcome and prevent the formation of ice on the windshields by directing a blast of heated air against the inside surface of the glass panel or by flowing heated air through an intermediate spacing provided between a double glazed window structure. Mechanical scraping and wiping means have also been employed for this purpose. In both such methods, due partly to the low heat conductivity of glass, only a small percentage of the heat reaches the outside surface to be de-iced, and by reason of the resultant high heat gradient through the glass panel, undesirably high inside air and glass surface temperatures are necessary. These result in a loss of most of the heat to the air inside the cockpit and thus to be at all effective must necessarily produce high glass temperatures which are conducive to deterioration of laminates and to the panel mounting structure. Power for the circulation of the heated air is required and this together with the heat losses attendant upon such method results in a de-icing method which is extremely inefficient and high in power requirements.

The mechanical scraper method is not reliable, it having been found to be subject to stalling in or overriding of formed ice films and apt to scratch the panel surface over which it moves.

It is therefore an object of this invention to provide a windshield de-icing apparatus which is free from the disadvantages inherent in those heretofore employed.

It is a further object of this invention to provide an apparatus for de-icing windshields which is simple of construction, reliable and efficient in operation and economical in utilization of power and free from convection and radiation heating effects within the windshield enclosure which are discomforting to pilot or passengers facing the windshield or positioned adjacent thereto.

The invention resides broadly in heating the interior of the transparent windshield panel body and also the incipient ice formation thereon by means of infra-red radiation directed to and partially transmitted through the said panel body.

Advantages of this apparatus are that the heating, by absorption of infra-red radiation, is effected directly within and throughout the thickness of the panel body and within the ice film itself without having to reach such points of heat application by conduction through the inherently low-conductivity panel material. This results in low glass temperature with low loss of heat to the interior of the windshield enclosure and consequently in a high efficiency in power utilization as compared to methods heretofore known and used.

Other objects, advantages, and features of novelty will be evident hereinafter.

In the drawing which illustrates a preferred embodiment of the invention and in which the same reference characters refer to the same or similar elements;

Figure 1 is a fragmentary perspective view of the interior of an airplane pilot's compartment showing the general arrangement of the de-icing apparatus.

Figure 2 is a cross-section of the windshield and de-icing apparatus taken on line 2—2 of Figure 1.

Figure 3 is a detached fragmentary side view of the radiation emitter apparatus.

Figure 4 is a detailed cross-section taken on line 4—4 of Figure 3.

In the drawing, the de-icing apparatus of the invention is illustrated as applied to the inside of the windshield of the pilot's compartment 10 of a typical airplane, although it may be similarly applied to windshields of other vehicles such as automobiles, locomotives, boats, and the like. Windshield panels 11 are mounted in suitable frames 12. The panels may be of the usual construction of either a single thickness of ordinary plate glass or preferably of a plurality of laminations bonded together in the manner of the so-called "safety glass" or non-shatterable glass. A suitable panel construction is one employing three superimposed laminations as shown at 13, 14 and 15, the outer lamination 13 to be positioned on the exterior of the enclosure being preferably a clear tempered plate glass which is nearly opaque to infra-red radiations in the glass thickness employed. An example of such a glass material is Herculite (tempered) plate glass manufactured by the Pittsburgh Plate Glass Company. The interior lamination 15, positioned nearest to the infra-red emitter, may be of the same material but preferably is of a material relatively transparent to the infra-red such as Pyrex or heavy flint glass in order to concentrate as much as possible the conversion of the radiations to heat in the outer layers of the panel nearest to the exterior surface of the windshield which is exposed to the icing conditions. A low temperature gradient through the transparent panel with a low inside surface temperature may thus be attained. The intermediate lamination 14 may be any one of the suitable transparent plastics employed in non-shatterable panes such as for example, cellulose acetate or, preferably, a plasticized polyvinyl butyrate. Flexseal, a laminated safety glass manufactured by the Pittsburgh Plate Glass Company is well suited to use as the transparent panel in this connection.

A single layer or a plurality of superimposed layers of glass or plastic which have very high transmission coefficients for infra-red radiation may alternatively be employed to advantage for the transparent panel. In such case very little of the infra-red radiation will be absorbed within the panel material itself and hence little heating of the panel material will be affected. Water and ice, however, being quite opaque to infra-red, will upon contacting it or upon formation of a layer or an incipient layer on the outside surface of the panel, intercept and absorb substantially all of the transmitted infra-red radiations and thus be heated at the interface sufficiently to prevent ice formation or to loosen such ice as has previously formed thereon. A heavy flint glass would be well suited for this purpose since it has a high transmission coefficient for infra-red radiations.

The infra-red radiation producing equipment H comprises an elongated, electrically heated infra-red radiation emitter 16 located at or near the focus line of a curved reflector 17. The reflector is preferably supported within the enclosure at a point adjacent the lower inner surface of the windshield as illustrated in the drawing and shaped and positioned to direct the emitted radiation substantially uniformly through the area of the windshield which it is desired to de-ice. The emitter and its reflector are preferably out of the normal line of sight of the occupant of the enclosure and at the same time in such angular position with respect to the windshield surface as to avoid directing the reflected portion of the radiation into the occupant's face and eyes. The infra-red radiation should preferably not strike the windshield surface at any point at an angle greater than 60° from the normal in order to prevent excessive loss due to reflection.

The reflector 17 may be constructed of any suitable metal such as for example stainless steel plated on the interior reflecting surface with copper or gold for the most efficient reflection of the infra-red. A filter glass 18 covering the reflector opening serves to absorb any visible radiation and to allow substantially only the infra-red radiation to pass. A suitable glass for this purpose is the No. 254 Corning infra-red filter. This glass may have a thickness of approximately one-sixteenth ($\frac{1}{16}$) of an inch.

The emitter 16 may comprise a tubular body 20 of a suitable heat resistant metal such as stainless steel or Inconnel having a diameter of approximately three-eighths ($\frac{3}{8}$) of an inch and containing an electrical resistance heating element 21 supported and centrally positioned by means of a powdered ceramic refractory material 22 introduced under pressure. Such an emitter which may be suitable for the present purpose is the "Calrod" heating element manufactured by the General Electric Company, the "Cromalox" rod manufactured by the Montgomery Brothers Manufacturing Company, and others. Such an element is capable of radiating approximately 15 watts per square centimeter of emitting surface.

It is found that under the worst conditions encountered approximately 1,800 to 2,000 B. t. u. per hour per square foot of windshield surface to be de-iced is required. Losses in the system illustrated are approximately 20% in the filter, 5% in the reflector, and 10% in reflection and transmission, resulting in an overall efficiency of approximately 65%. This is many times the efficiency of the hot air heating methods heretofore employed, as well as being much lighter in weight.

The heating element 21 of the emitter 16 is supplied with electric current through conductors 24, 25 and 26 and switch 27 from a suitable source 28 which may be a storage battery of suitable voltage or preferably an engine driven alternating current generator. Alternating current is preferable for the reason that the flow of current through the heater and associated electrical conductors does not induce a magnetic field of constant polarity which may interfere with the action of the magnetic compass, as might be the case with direct current.

The foregoing is illustrative of the apparatus of the invention and is not to be limiting. The invention includes any apparatus which accomplishes the same end within the scope of the appended claims.

I claim:

1. Apparatus comprising a transparent panel, an emitter of radiations of relative high intensity in the infra-red and relatively low in the visible region of the spectrum positioned adjacent the surface of said panel, means to remove substantially all of the visible radiations from said infra-red radiations, and reflector means to project said radiations toward the surface of said panel whereby said infra-red radiation may be received by and converted into heat within the body of said panel.

2. An infra-red ray projector in combination with a transparent windshield panel having a low transparency coefficient for infra-red radiations comprising an emitter of radiations of relatively high intensity in the infra-red and relatively low intensity in the visible region of the spectrum, filtering means for eliminating the visible radiations of said emitter, reflector means associated with and supporting said emitter and filtering means, and means for mounting said reflector adjacent a margin of said windshield outside the line of sight therethrough and so constructed and positioned as to direct said infra-red radiations against the entire windshield surface at angles within sixty degrees of a normal thereto whereby to minimize reflection of heat rays from the surface of said windshield.

HAROLD A. GREENWALD.